United States Patent [19]

Thoraval et al.

[11] Patent Number: 5,600,220

[45] Date of Patent: Feb. 4, 1997

[54] SYSTEM FOR SERVO-CONTROLLING AN AIRCRAFT FLIGHT CONTROL MEMBER

[75] Inventors: Bruno Thoraval, Frepillon; Jean-Luc Bertrand, Tours, both of France

[73] Assignee: Lucas France, Paris, France

[21] Appl. No.: 292,483

[22] Filed: Aug. 18, 1994

[30] Foreign Application Priority Data

Aug. 20, 1993 [FR] France .................................. 93 10166

[51] Int. Cl.$^6$ .................................................. B64C 13/42
[52] U.S. Cl. .......................... 318/562; 318/563; 318/564; 318/652; 318/9; 60/403; 244/78
[58] Field of Search ........................... 318/560, 562–565, 318/652, 657, 9–11, 14; 60/403–406; 91/459; 244/78, 76 A; 303/13–15; 364/149–155; 416/112–114

[56] References Cited

U.S. PATENT DOCUMENTS

| | | | |
|---|---|---|---|
| 3,585,902 | 6/1971 | Anderson | 91/363 |
| 4,138,088 | 2/1979 | Cyrot | 251/30 |
| 4,345,191 | 8/1982 | Takats et al. | 318/564 |
| 4,362,085 | 12/1982 | Venuti, Jr. | 91/186 |
| 4,428,196 | 1/1984 | Boehringer | 60/403 |
| 4,472,780 | 9/1984 | Chenoweth et al. | 318/564 X |
| 4,472,998 | 9/1984 | Vanderlaan | 91/510 |
| 4,533,097 | 8/1985 | Aldrich | 244/78 |
| 4,649,484 | 3/1987 | Herzog et al. | 318/564 X |
| 4,794,755 | 1/1989 | Hutto, Jr. et al. | 60/39.281 |
| 4,887,214 | 12/1989 | Takats et al. | 364/424.01 |
| 4,965,879 | 10/1990 | Fischer, Jr. | 364/424.01 |
| 5,011,373 | 4/1991 | Aubry et al. | 416/108 |
| 5,044,697 | 9/1991 | Longyear et al. | 303/14 |
| 5,100,082 | 3/1992 | Archung | 244/78 |
| 5,181,380 | 1/1993 | Favre et al. | 60/405 |
| 5,274,554 | 12/1993 | Takats et al. | 364/424.03 |
| 5,310,315 | 5/1994 | Lafortune et al. | 416/114 |
| 5,353,685 | 10/1994 | Snow | 91/459 |
| 5,493,497 | 2/1996 | Buus | 364/434 |

FOREIGN PATENT DOCUMENTS

| | | |
|---|---|---|
| 0068728 | 5/1983 | European Pat. Off. . |
| 0256648 | 2/1988 | European Pat. Off. . |
| 2149940 | 10/1984 | United Kingdom . |

*Primary Examiner*—Brian Sircus
*Attorney, Agent, or Firm*—Blakely Sokoloff Taylor & Zafman

[57] ABSTRACT

A servo-control system for actuating an aircraft flight control member, the system including at least one hydraulic actuator together with actuation means for actuating said actuator, said hydraulic actuator being duplicated, said actuation means including first and second actuation assemblies each comprising two hydraulic circuits each controlled by a respective mechanically-controlled distributor valve, the two distributor valves of the same actuation assembly being actuated by common mechanical elements caused to move by motor means, the actuation means including control means controlling said motor means as a function of the position of the flight control member and of piloting orders received by the control means, detection means for detecting failures, and a selector valve which controls switching of the actuation assemblies between an active state and a reserve state.

9 Claims, 2 Drawing Sheets

SYSTEM FOR SERVO-CONTROLLING AN AIRCRAFT FLIGHT CONTROL MEMBER

The present invention relates to a servo-control system for controlling the position of an aircraft flight control member.

By way of example, such a flight control member may be a blade of a helicopter rotor and the servo-control system serves to control the pitch orientation thereof by tilting and sliding the bottom cyclic swash-plate of said rotor relative to the axis thereof.

BACKGROUND OF THE INVENTION

Electrical flight controls have been in use for many years in aviation. In particular, in certain airplanes such as the Airbus A 320, pilot orders are transmitted from the cockpit to a computer which actuates electrically-controlled servo-valves. Each of the servo-valves controls a hydraulic circuit which actuates an actuator with the displacement thereof being mechanically connected to one of the flight control members to be moved (flap or control surface).

To ensure control safety and to avoid breakdown of an electrical circuit giving rise to a complete breakdown of the member whose position is under control, one solution consists in controlling the hydraulic circuit of the displacement actuator connected to said member via four electrical circuits that control four mechanical displacements. Mechanical means integrated in the hydraulic circuit enable motion to be transmitted to the actuator which is a mean of said four displacements.

In the event of failure in one of the control circuits, the other three control circuits maintain the position of the flight control member.

In theory, the apparatus can withstand three successive failures of the control circuits.

Nevertheless, that solution is mechanically very complex.

OBJECTS AND SUMMARY OF THE INVENTION

A main object of the invention is to propose a servo-control system for an aircraft flight control member that is simpler and that provides equivalent safety.

Proposals have already been made to implement servo-control systems including a plurality of control circuits only one of which is activated at any one time to control displacement of the flight control member, the other circuits being reserve circuits.

When a failure of the first control circuit is detected, one of the reserve circuits takes over from the first circuit.

Nevertheless, at present, no solution has been proposed that enables changeover from one control circuit to another to take place both reliably and quickly.

The invention provides a servo-control system for actuating an aircraft flight control member, the system comprising at least one hydraulic actuator mounted between said member and another portion of the aircraft, together with actuator means for actuating said actuator, said hydraulic actuator being a duplicated actuator, said actuation means including a first actuation assembly comprising two hydraulic circuits each controlled by a mechanically-controlled distributor valve, said two distributor valves being actuated by common mechanical elements caused to move by motor means, the actuation means including control means controlling said motor means as a function of the position of the flight control member and of the piloting orders it receives, the system including a second actuation assembly of the above-specified type in which the distributor valves are actuated simultaneously with those of the first assembly and in a manner similar thereto, and also including means for detecting the failure of at least one element of one or the other of said first and second actuation assemblies, together with a selector valve having two states, said selector valve selectively putting the hydraulic circuits of the first and second actuation assemblies into communication with the hydraulic circuits of the actuator, such that in a first state of the selector valve the first actuation assembly is active and controls the actuator, the second actuation assembly being in reserve, and in a second state of the selector valve the first and second actuation assemblies are respectively in reserve and active, said selector valve being switched from one of its states to the other under the control of the control means as a function of any failure(s) detected by the detection means.

Advantageously, each of the first and second actuation assemblies includes two drive units capable of driving the common mechanical elements actuating their distributor valves; in operation, one of the two drive units in a single actuation assembly is operational while the other one is passive, the control means acting simultaneously with the selector valve being caused to change over from one of its states to the other, to cause the operational drive unit in that one of the actuation assemblies that was active and that is being put into reserve to change over to the passive state, and also causing the other drive unit of said actuation assembly to change over from the passive state to the operational state.

BRIEF DESCRIPTION OF THE DRAWINGS

Other characteristics and advantages of the invention appear further from the following description of a particular embodiment. The description is purely illustrative and non-limiting. It should be read with reference to the accompanying drawings, in which.

MORE DETAILED DESCRIPTION

Figure 1:
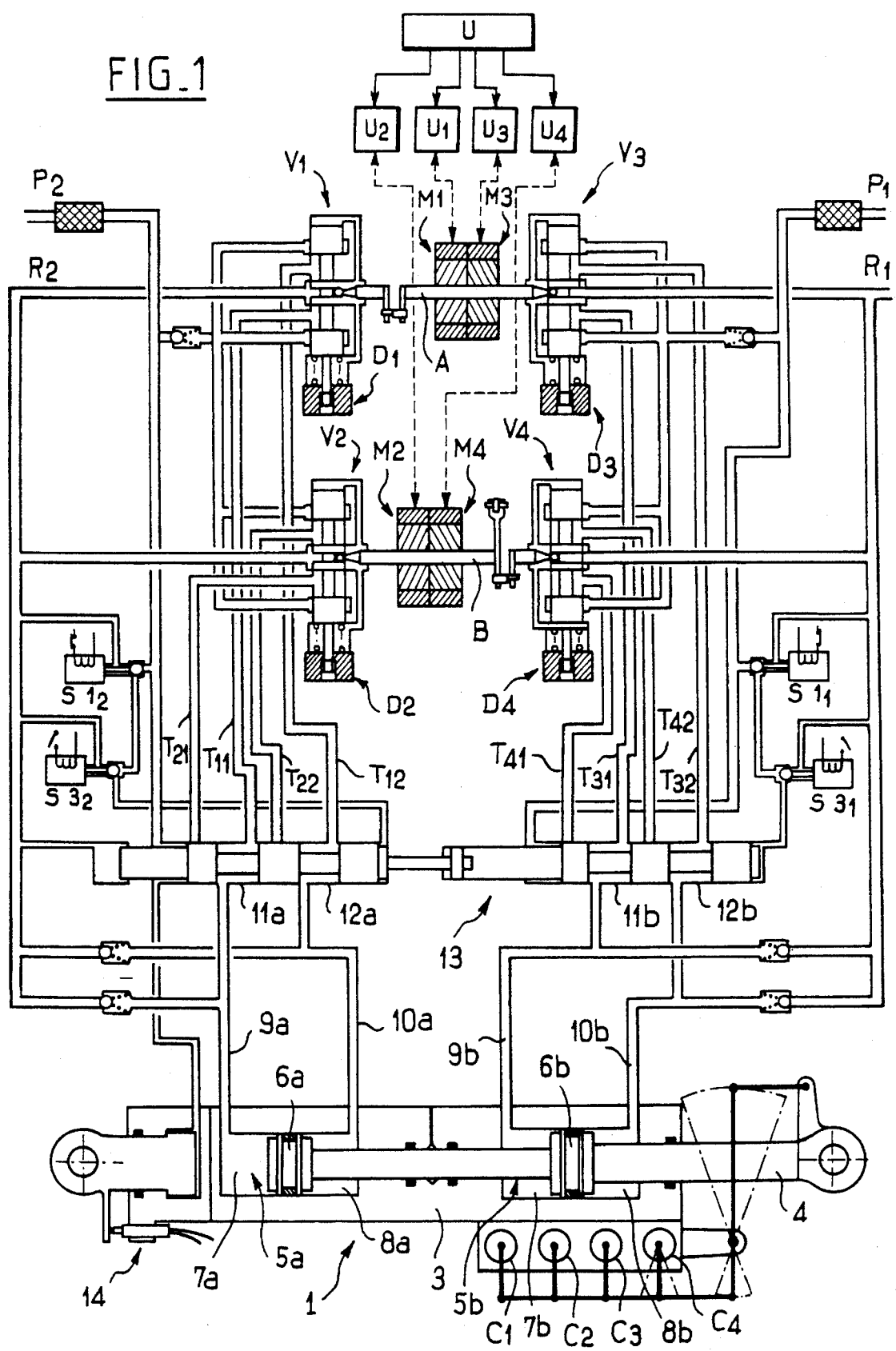
FIG. 1 is a diagram of the servo-control system of the invention in one particular operational mode thereof.

The servo-control system shown in the figures mainly comprises a hydraulic actuator 1 and means for actuating said hydraulic actuator 1. The hydraulic actuator 1 may, for example, be one of the actuators connected to the bottom cyclic swash-plate of a helicopter rotor, which actuators control the pitch orientation of the blades of the rotor by sliding and tilting the bottom cyclic swash-plate relative to the axis of the rotor.

The actuator mainly comprises a generally cylindrical body 3 having a rod 4 that slides axially therein. The end of the rod 4 lying outside the body 3 is connected to a connecting rod (not shown) that connects it to the bottom cyclic swash-plate, while the opposite end of the body is connected to a portion of the helicopter that is stationary relative to the fuselage thereof.

The body 3 has two cylindrical hydraulic chambers referenced 5a and 5b disposed axially therein, each having a respective piston 6a or 6b carried by the rod 4 sliding therein. The pistons 6a and 6b define two compartments 7a & 8a and 7b & 8b in the chambers 5a and 5b respectively. Each of the compartments 7a, 8a, 7b, and 8b has a channel opening out therein for feeding or exhausting hydraulic fluid and given a respective reference 9a, 10a, 9b, or 10b.

The channels 9a, 10a, 9b, and 10b open out into respective compartments 11a, 12a, 11b, and 12b in a selector valve 13.

Figure 2:
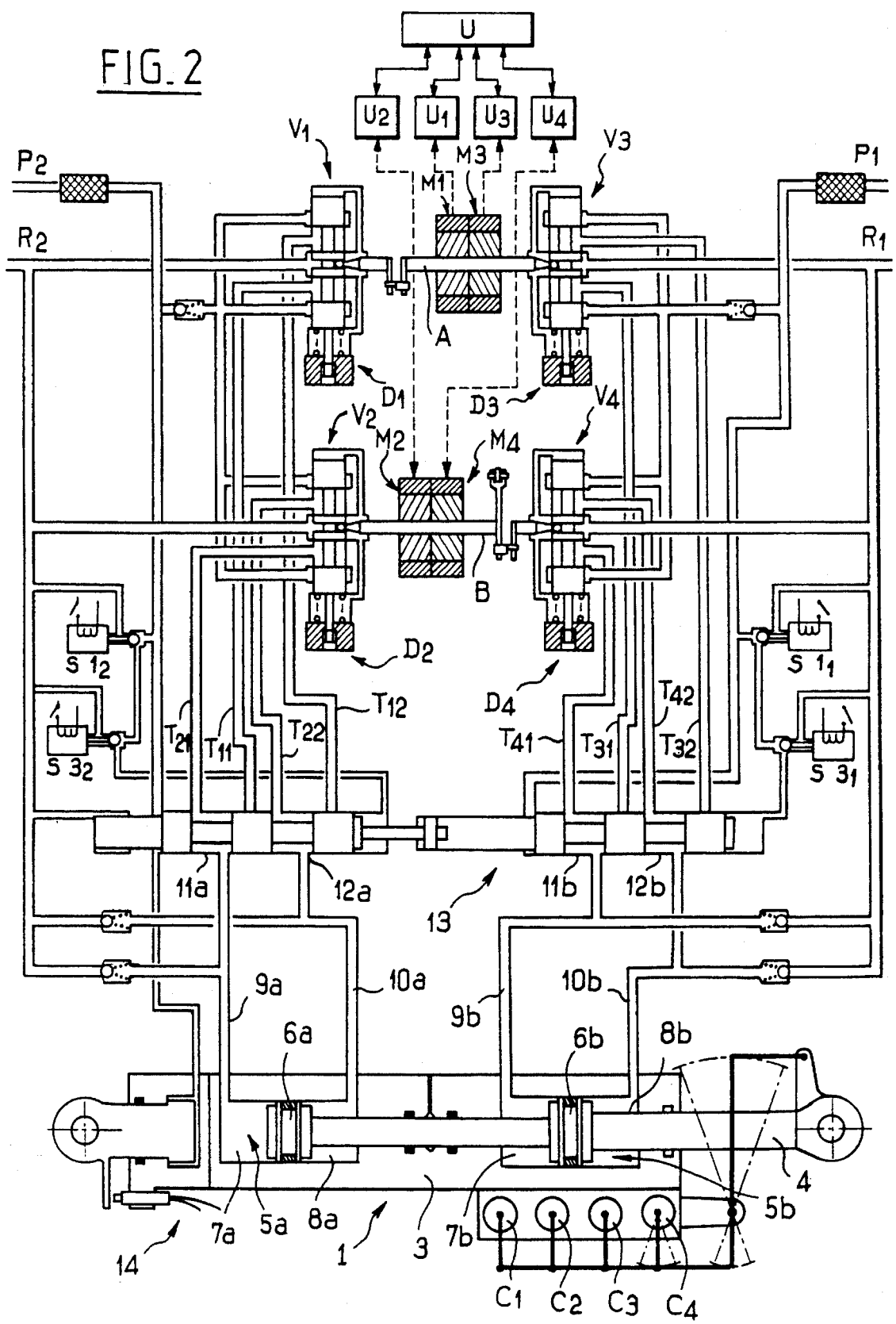
FIG. 2 is a diagram of the servo-control system of FIG. 1, but in another operational mode.

The selector valve 13 is a valve of the slider type. Depending on the position of its own inside rod, it enables the channels 9a, 10a, 9b, and 10b to be put into communication either with respective channels T11, T12, T31, and T32 (FIG. 1), or else with respective channels T21, T22, T31, and T42 (FIG. 2). The channels T11 and T12 form a pair of feed/exhaust control channels for displacing the piston 6a in the chamber 5a. The same applies to the pair of channels T21 and T22. As for the channels T31 and T32, and also T41 and T42, they form pairs of feed and exhaust channels for controlling displacement of the piston 6b.

Each such pair of feed and exhaust channels is connected for that purpose to a respective control valve referenced V1 to V4. The valves V1 to V4 are slide valves of the proportional distributor type and each of them is controlled by a rotary electric motor given a respective reference M1, M2, M3, or M4.

The motors M1 and M3 have a common shaft A which is coupled at each of its ends to crank type means enabling its axial rotary motion to be transformed into identical linear displacements of the internal control members of the valves V1 and V3. The motors M2 and M4 have a common shaft B connected in similar manner to the valves V2 and V4.

The valves V1 and V2 are hydraulically fed from a high pressure circuit P2 and a low pressure circuit R2. The valves V3 and V4 are fed from a high pressure circuit P1 and a low pressure circuit R1.

Depending on the position of the internal element of the valve V1 within the body of the valve:

the channel T11 is in communication with the high pressure circuit P2 while the channel T12 is in communication with the low pressure circuit R2;

the channel T11 is in communication with the low pressure circuit R2 while the channel T12 is in communication with the high pressure circuit P2; or the channels T11 and T12 are isolated from the low pressure and the high pressure feeds of the valve V1 (the position shown in the figures for the internal control member of the valve V1), such that hydraulic fluid no longer flows along said channels.

The operation of the valves V2 to V4 is similar.

Each of the motors M1 to M4 is controlled by an electronic control unit given respective references U1 to U4, and with which it constitutes a "drive unit" within the meaning of the invention.

These units U1 to U4 communicate with one another. From a control unit U they receive orders relating to displacements of the actuator 1 as required by the pilot of the aircraft.

The control units U1 to U4 also receive information relating to the actual displacement of the rod 4 of the actuator 1 relative to its body 3, which information is transmitted thereto by displacement sensors given respective references C1 to C4. The four displacement sensors C1 to C4 are mounted on a common connecting rod that is connected to the rod 4. An overload sensor mounted on the actuator 1 and referenced 14 in the figures is also connected to the units U1 to U4.

The high and low pressure circuits P1, P2 and R1, R2 are also used via four electrically-controlled valves S11, S12, S31, and S32 to control the position of the internal control member of the selector valve 13 relative to the body thereof.

Valve S11 is a three-port valve that puts a duct connecting it to valve S31 into communication either with the high pressure circuit P1 or else with the low pressure circuit R1. Valve S31 is a three-port valve that puts one of the hydraulic chambers controlling the selector valve 13 into communication either with the above-specified duct connecting it to the valve S11, or else with the low pressure circuit R1. The selector valve 13 includes another hydraulic chamber which is fed by the high pressure circuit P1.

The electrically-controlled valves S12 and S32 control communication between the high pressure and low pressure circuits P2 and R2 and the other two chambers of the selector valve 13.

The valves S11 and S12 are controlled by the unit U1; the valves S31 and S32 are controlled by the unit U3.

As a function of the various items of information that they receive, the units U1 to U4 are associated with means enabling them to detect the failures that may occur in the various elements constituting the servo-control system.

In particular, the units U1 to U4 are coupled to the displacement sensors D1 to D4, thereby providing them with information relating to the position of the internal control members of the distributor valves V1 to V4 relative to the bodies thereof. These sensors are constituted by elements forming ferromagnetic cores that terminate the internal elements of the distributor valves V1 to V4, associated with coil-forming means that detect the displacements of the core-forming elements.

An electrical failure of one of the motors M1 to M4 or of the electrical connection between such a motor M1 to M4 and the unit U1 to U4 that controls it is detected by comparing the order delivered by the unit U1 to U4 corresponding to the motor M1 to M4 with information derived from the sensor D1 to D4 associated with the corresponding valve V1 to V4.

The failure of the mechanical link between one of the motors M1 to M4 and the corresponding valve V1 to V4 is detected by comparing the information derived by the sensor D1 with that from the sensor D3 (for the motors M1 and M3), and also by comparing the information derived from the means D2 with the information derived from the means D4 (for the motors M2 and M4).

Failure in the operation of one of the valves V1 to V3 is detected by comparing information derived from the corresponding detection sensor D1 to D3:

firstly with information derived from the detector sensor D2 to D4 corresponding to the valve V2 to V4; and secondly on the basis of an estimate calculated by the unit U1 to U3 concerning the displacement that the internal element of said valve V1 to V3 ought to have performed.

A failure in one of the units U1 to U4 or in the detection loop for the valves V1 to V4 controlled thereby is detected by comparing the orders generated by each of the units U1 to U4. When a significant difference between these various orders is detected, then the different unit is considered as being faulty.

Failure of the selector valve 13 is taken as being the same as failure either of the valves S11 and S12 under the control of the unit U1, or of the valves S31 and S32 under the control of the unit U3. Failures of these valves which are electrically controlled are detected on the basis of measuring the currents that control them.

In normal operation (FIG. 1), only the units U1 and U2 are in operation and they actuate their respective motors M1 and M2. The valves S11 and S12 are switched on so that the two control chambers of the selector valve 13 are in communication with the respective low pressure circuits R1 and R2, the opposite chambers being in communication with the high pressure circuits P1 and P2. The selector valve 13 then puts the channels 9a and 10a into communication with the channels T11 and T12, and also the channels 9b and 10b into communication with the channels T31 and T32.

The control units U3 and U4 are in waiting states and they do not actuate the motors M3 and M4 under their control. The drive units constituted by said control units U3 and U4 together with the associated motors M3 and M4 are therefore passive.

Thus, displacement of the pistons 6a and 6b in the chambers 5a and 5b is under the control of the first actuation assembly constituted by the channels T11 and T12, the channels T31 and T32, the valves V1 and V3, the shaft A, the motors M1 and M3, and the control units U1 and U3. It is this first actuation assembly that is active.

Motion of the shaft B under the control of the unit U2 via the motor M2 is not applied to the actuator 1 since the channels T21 and T22, and also the channels T41 and T42 are closed by the selector valve 13. The actuation assembly defined by the channels T21, T22, T41, and T42, the distributor valves V2 and V4, the shaft B, the motors M2 and M4, and the control units U2 and U4, is in reserve.

If one of the failures as described above is detected on the active unit U1 or on one of the elements under its control, then said unit U1 ceases to apply orders to the motor M1. The valves S11 and S12 are deactivated so that all of the control chambers of the selector valve 13 are in communication either with the high pressure circuit P1 or else with the high pressure circuit P2. The selector valve then takes up its other state (FIG. 2), i.e. its state in which it is the channels T21 and T22, and also the channels T41 and T42 that are in communication with the feed and exhaust channels 9a and 10a, and also 9b and 12b. The unit U3 becomes operational.

Thus, movement of the rod 4 is controlled by the unit U2 which actuates the shaft B. The unit U3 and the motor M3 constitute an operational drive unit that is in reserve.

It may be observed that if one of the above-described operation does not take place, then the servo-control system continues to operate adequately since:

the fact that the control unit U1 does not switch itself off does not prevent the unit U2 from controlling the actuator 1, since the channels T11 and T12 and also the channels T31 and T32 are closed by the selector valve 13;

the fact that the unit U3 is not operating does not prevent the unit U2 from controlling the actuator 1; and in the event that the selector valve 13 remains in its initial state, then the unit U3 controls displacement of the rod 4 relative to the body 3.

In the event that the unit U2 (or U3 as the case may be) is active and a failure is detected in one of the elements controlled by said unit, then the servo-control system changes over in the same manner as described above to operation under the control of the unit U3 (or U4 as the case may be).

The helicopter can thus withstand three successive failures. It is only in the event of four successive failures that there is a risk of operation not taking place, and that corresponds to a probability of less than $10^{-9}$ per hour of flight.

It may also be observed that another considerable advantage of such a servo-control system lies in that it can easily be checked on the ground, without it being necessary to put the circuits P1 and P2 under pressure.

In particular, it is possible to check:

the valves S11, S12, S31, and S32 by passing electricity through them;

the operation of the detector means D1 to D4, the operation of the valves V1 to V4, the mechanical links between the motors M1 to M4 and the valves V1 to V4, the electrical circuits that control the motors M1 to M4, and the operation of the units U1 to U4, by implementing the various failure tests as described above on the units U1 to U4; and the overload sensor in the absence of the hydraulic circuit by verifying the overload signal given to the pilot.

Once the above verifications have been performed, it is also possible to verify the operation of the selector valve 13 by putting one of the hydraulic circuits P1 and P2 under a pressure of 50 bars to 200 bars and by putting each of the units U1 to U4 into operation in succession. The selector valve 13 should then pass from one state to another under the control of the valves S11 and S12 associated with the unit U1 or under the control of the valves S31 or S32 under the control of the unit U3.

The invention is described above in the particular circumstance of a servo-control system that controls the pitch orientation of a blade in the main rotor of a helicopter, however it is also applicable to controlling any other aircraft flight control member: it may control the pitch of the blades of a helicopter tail rotor, the orientation of the flaps or the control surfaces of an airplane, etc.

Likewise, in an advantageous variant of the invention, the system includes means enabling the pilot to take over direct mechanical control of the movement of the blade.

We claim:

1. A servo control system for actuating an aircraft flight control member, the system comprising:

(A) an hydraulic actuator unit for actuating the flight control member, said actuator unit comprising two hydraulic actuators;

(B) an actuation means for actuating said hydraulic actuator unit, said actuation means comprising first and second actuation assemblies, each assembly comprising (1) two hydraulic circuits, (2) two mechanically controlled distributor valves, each distributor valve operates a hydraulic circuit, and (3) two drive units including motor means for actuating said distributor valves, wherein each drive unit has an active and a passive state, and one unit is in the active state and the other is in the passive state;

(C) means for detecting a failure of at least one element of the first or second actuation assemblies;

(D) a selector valve, having two states, for connecting the hydraulic circuits of the first and second actuation assemblies with the hydraulic circuits of each actuator wherein in a first state of the selector valve the first actuation assembly is in an active state and the second actuation assembly is in a reserve state, and in a second state of the selector valve, the first actuation assembly is in a reserve state and the second actuation assembly is in an active state; and (E) control means for (1) controlling the motor means to operate the drive units as a function of a detected position of the flight control member and of piloting orders, wherein the distributor valves of the first and second actuation assembly are actuated simultaneously, (2) controlling switching of said selector valve from one state to the other upon detection of failure by the means for detecting a failure, and (3) controlling, upon detection of a failure, the active drive unit in one of the actuation assemblies to change from the active to passive and controlling the passive drive unit in the same assembly to change from the passive to active state, wherein the change of drive units occurs simultaneously with the selector valve switching.

2. A system according to claim 1, wherein the detection means include means for detecting a failure to operate in a mechanically-controlled valve.

3. A system according to claim 2, wherein said means comprise means for comparing the operation of the two valves in the same actuation assembly.

4. A system according to claim 1, wherein the detection means include means for detecting a failure of the motor means and for detecting the connection between the control means and said motor means.

5. A system according to claim 4, wherein said means include comparator means for comparing the operation of the valves actuated by said motor means with the orders delivered thereto by said control means.

6. A system according to claim 1, wherein the detection means include means for detecting failures in the mechanical connections between the motor means and the mechanically-controlled valves.

7. A system according to claim 1, including means for detecting a failure in the operation of the control means.

8. A system according to claim 1, wherein a mechanically-controlled distributor valve is a valve of the slider type, the detector means including means for detecting displacement of the internal member of said valve within the body thereof, the latter means including a ferromagnetic core carried by said internal member, associated with coils through which said core passes when the internal member moves.

9. A use of a servo-control system according to claim 1 for controlling the pitch orientation of a blade of an aircraft rotor, in particular of a helicopter rotor.

* * * * *

UNITED STATES PATENT AND TRADEMARK OFFICE
CERTIFICATE OF CORRECTION

PATENT NO. : 5,600,220
DATED : February 4, 1997
INVENTOR(S) : Thoraval et al.

It is certified that error appears in the above-identified patent and that said Letters Patent is hereby corrected as shown below:

In column 5 at line 35, please delete " 12b " and insert -- 10b --.

Signed and Sealed this

Eighteenth Day of November 1997

Attest:

BRUCE LEHMAN

Attesting Officer      Commissioner of Patents and Trademarks